May 16, 1950  E. S. SMITH  2,507,825
MEANS FOR FORMING SHEATHED ELECTRICAL
HEATING ELEMENTS
Filed June 22, 1946  5 Sheets-Sheet 3

Inventor
Elmore Stanley Smith

May 16, 1950

E. S. SMITH 2,507,825

MEANS FOR FORMING SHEATHED ELECTRICAL HEATING ELEMENTS

Filed June 22, 1946

Inventor
Elmore Stanley Smith
by
ATTY.

May 16, 1950 E. S. SMITH 2,507,825
MEANS FOR FORMING SHEATHED ELECTRICAL
HEATING ELEMENTS
Filed June 22, 1946 5 Sheets-Sheet 5

Inventor
Elmore Stanley Smith
ATTY.

Patented May 16, 1950

2,507,825

UNITED STATES PATENT OFFICE 2,507,825

MEANS FOR FORMING SHEATHED ELECTRICAL HEATING ELEMENTS

Elmore Stanley Smith, Weston, Ontario, Canada

Application June 22, 1946, Serial No. 678,559

14 Claims. (Cl. 219—6)

This invention relates to apparatus for forming sheathed electrical heating elements, and particularly to apparatus for closing and/or welding together projecting flanges of heating elements such as shown in my United States Patent No. 2,272,136.

One feature of the invention is the provision of means for closing the flanges and welding them together in successive operations. Other features of the invention relate to the means for carrying out the closing and welding operation including gripping means for holding the element, means for compressing the flanges, means for welding, and controls for the machine.

The invention is hereinafter particularly described and is illustrated by way of example in the annexed drawings in which.

In the drawings corresponding numerals refer to corresponding parts in the different figures.

Generally speaking the invention comprises gripping members which grip the element between them with the flanges protruding above them and which are reciprocable to carry the element first between forming rollers and then between welding rollers and back again to the place of beginning. During the return movement the welding rollers will be inoperative, but the forming rollers may be utilised to compress the flanges after welding to prevent distortion of the element when it is removed from the gripping members. The element may be carried twice between the forming rollers to close the flanges in two operations before the welding operation is carried out.

The gripping members 1 are slidably mounted on an I-beam 2 which is mounted on suitable frame members. The gripping members are preferably formed in a plurality of sections each of which is identical in construction and connected to the adjacent section. Secured to opposite ends of the gripping members are the ends of a chain 3 which travels over the I-beam 2 and around sprockets 4 and 5 at each end of the I-beam. Beneath the I-beam tension rollers 6, 6, 6 may be provided engaging the chain 3.

The sprocket 5 is rotated by means of motor 100 in a manner hereafter described in some detail.

Figure 6:
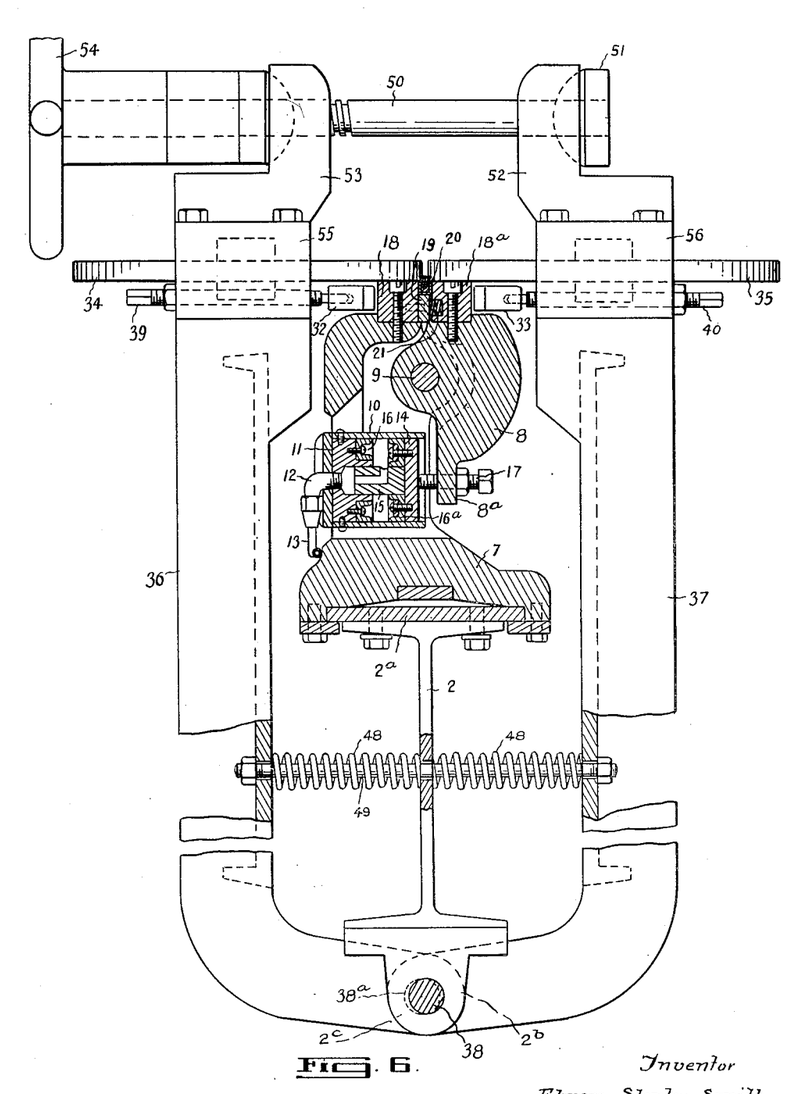
Figure 6 is a vertical section through the machine on the lines 6—6 in Figure 1.

The construction of the gripping members can be seen more particularly in Figure 6 where it will be seen that the gripping members ride on a plate 2a bolted to the upper end of the I-beam 2. Each gripping member comprises a fixed jaw 7 and a movable jaw 8 which is pivoted on a pin 9. A recess is formed in the fixed jaw member 7, and the pivoted jaw member 8 extends into said recess, the pin 9 extending from one side to the other of the recess having its ends secured to the ends of the fixed jaw member 7.

Mounted in the said recess in the fixed member 7 is an actuating cylinder 10 having a head 11 with a central aperture therein to receive a nipple 12 to which is connected a compressed air line 13. Piston 14 which is reciprocable in the cylinder 10 is provided with an annular inward extension 15 which fits into a recess in the head 11 and is provided with a passageway therein extending from the end longitudinally and transversely so that it communicates with the interior of the cylinder 10.

Gaskets or washers 16 and 16a are provided on the piston and cylinder head respectively. It will be observed that when compressed air is admitted into the cylinder the piston will be forced out. A screw 17 extends through the tail 8a of the movable jaw 8 and engages the piston 14. This is adjustable as desired to obtain the desired movement of the movable jaw 8. When the piston is forced out by the compressed air, the tail 8a of the movable jaw 8 is forced out causing the upper end of the movable jaw 8 to move towards the upper end of the fixed jaw 7.

Bolted to the upper ends of the two jaws are rectangular metal bars 18 and 18a and bolted to the bar 18 is a strip 19 of substantially the same width as the base of the element 20 which is shown in position between the jaws. The angle between the bar 18 and the strip 19 forms a shoulder to receive said element 20. A spring 21 is compressed in a recess in the side face of the bar 18, tending to press against strip 19 to spread the jaws apart when the air pressure is relieved, thus permitting the jaws to open to insert or remove the element therebetween.

Figures 1, 2, 3, 4, 5, 13:
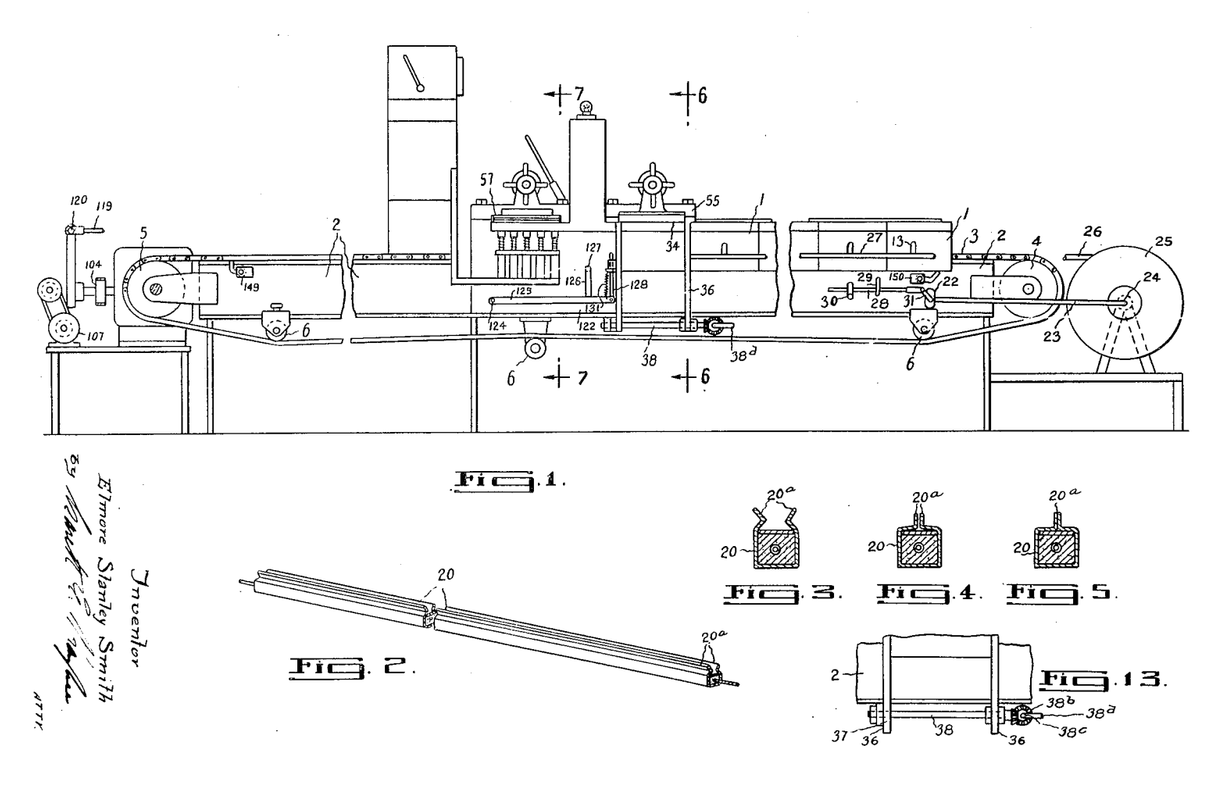
Figure 1 is a side elevation of the machine.
Figure 2 is a perspective view of a length of the element, partly broken away, in the form which it takes prior to being closed and welded.
Figure 3 is a cross-section of the element shown in Figure 2.
Figure 4 is a cross-section of the same element after it has partially closed.
Figure 5 is a cross-section of the same element after it has been fully closed and is ready for welding.
Figure 13 is a fragmentary side elevation showing the mounting of the arms on which the forming rollers are supported.

Air is supplied to the cylinders and the gripping members from a source of air pressure through valve 22 shown in Figure 1 and line 23 to axle 24 of a reel 25 on which a flexible hose 26 is wound which is connected to an air line 27 which extends along the base of the fixed jaws of the gripping members and which is tapped by air pipes 13 which carry the air to the individual cylinders of each section of the gripping members. As the gripping members move back and forth, the flexible tube 26 will wind and unwind on the reel 25 thus providing a constant supply of air to the gripping members.

A sliding rod is journalled on brackets 29 which extend out from and are secured to the web of the I-beam 2 and one or more handles 30 extend outwardly from said rod 28. By sliding the rod 28 by means of handle 30 the valve 22 is opened or closed by means of suitable linkage 31.

The element 20 in the form shown in Figures 2 and 3 is inserted between the jaws of the gripping members and the valve is then actuated to clamp the element between the jaws. The projecting flanges 20a, 20a are then passed between the forming rollers hereinafter described to close the element and then through the welding rollers hereinafter described to weld the flanges 20a together.

Figure 8:
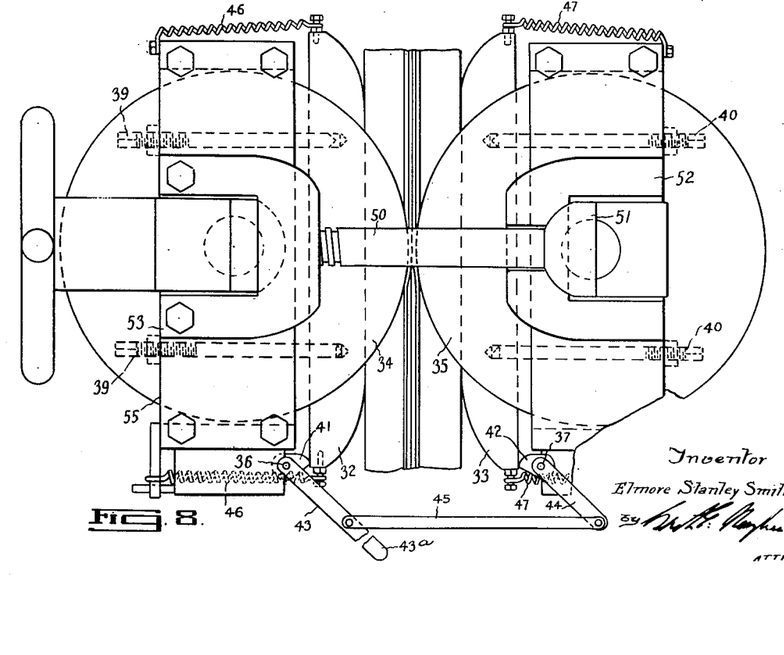
Figure 8 is a plan view of part of the forming rollers.

Referring now to Figures 6 and 8 guide members 32 and 33 are provided to center the gripping members as they pass beneath forming rollers 34 and 35. The guide members and the forming rollers are mounted on oppositely disposed arms 36 and 37 as shown in Figure 6, which are swingably mounted on a shaft 38 which passes between and is journalled in lugs 2b, 2c secured to and extending beneath the I-beam 2.

The guide members 32 and 33 are mounted respectively on adjustable pins 39, 39 and 40, 40 below the forming rollers 34 and 35. These pins are screwed into the upper ends of the arms 36 and 37 and are provided with lock nuts so that they can be held in desired adjusted position. It will be seen that by screwing in the pins 39 and 40 the guide members 32 and 33 will be moved closer together and vice versa so that they can be accurately adjusted so as to engage the sides of the gripping members, thus centralizing the gripping members so that the flanges of the element will be tangential to the forming wheels.

After the guide members have been initially adjusted on the pins 39 and 40 they may be brought into close contacting relationship with the sides of the gripping members for the forming operation and moved out of contacting relationship after the forming operation is completed. The means for closing and separating the guide members shown in Figure 8 comprises cams 41 and 42 mounted on arms 36 and 37 and operable by levers 43 and 44 respectively which are connected by a link 45. The arm 43 extends beyond the point at which the link 45 is pivoted thereto to form a handle 43a. By pushing or pulling the handle, the cams 41 and 42 will be turned to permit the guide members 32 and 33 under the influence of springs 46, 46 and 47, 47 to be advanced or retracted. In Figure 8 the guide members are shown in the advanced gripping member engaging position.

Compression springs 48, 48 shown in Figure 6 are mounted on a rod 49 which extends through flanges on the arms 36 and 37, the compression springs tending to spread the arms 36 and 37 apart to separate the forming rollers.

The forming rollers are drawn together by means of a screw 50 having a head 51 which is located in a recess in a lug 52 mounted on arm 37 (see Figures 6 and 8). The head 51 is inserted in said recess by dropping the shaft of the screw 50 through a transverse slot in said lug 52. A lug 53 mounted on arm 36 is provided with a transverse threaded hole into which screw 50 is threaded, and at the end of screw 50 is a wheel 54. By turning the wheel in one direction the screw will draw the arms 36 and 37 together and by turning it in the other direction it will permit them to spread apart under the influence of springs 48, 48.

It will be observed that the lugs 52 and 53 are mounted on bridges 55 and 56 which are bolted to the upper ends of the arms 36 and 37 respectively and extend over the wheels 34 and 35. It will also be noted that the wheels 34 are journalled on the upper end of the arms 36 and 37 and the bridges 55 and 56 respectively.

It has been found that if the closing process is completed in one operation there is a tendency for the flanges to spring open, and to avoid this it is preferred to subject the element to a two stage closing process before welding, which can be done by passing the element back and forth between the forming rollers with the rollers at different elevations so that on the first pass the flanges are gripped at a higher place than on the subsequent pass. This effect is achieved by forming on the shaft 38 on which the arms 36 and 37 are mounted eccentrics 38a as shown in Figure 6. As shown in Figure 13 the shaft 38 is provided at one end with a bevel gear which meshes with bevel gear 38b on spindle 38c. A handle 38d is secured to spindle 38c. By turning the handle and thus rotating the shaft the eccentrics will raise the arms 36 and 37 so that the forming rollers will engage only the upper edge of the flanges 28a, 28a of the element and by lowering the lever 38a, the rollers will be brought down so as to engage the whole of the flange and complete the closing thereof.

When the gripping members carrying the fully closed element have passed the forming rollers or wheels, they will pass beneath the welding wheels 57 and 58 which like the forming wheels are in opposed relationship and horizontally arranged, being rotatably mounted on opposed arms 59 and 60 which are similar to the arms 36 and 37 on which the forming rollers are mounted and which are therefore not shown in the drawings and not described except insofar as is necessary to describe the mounting of the welding wheels.

Figure 7:
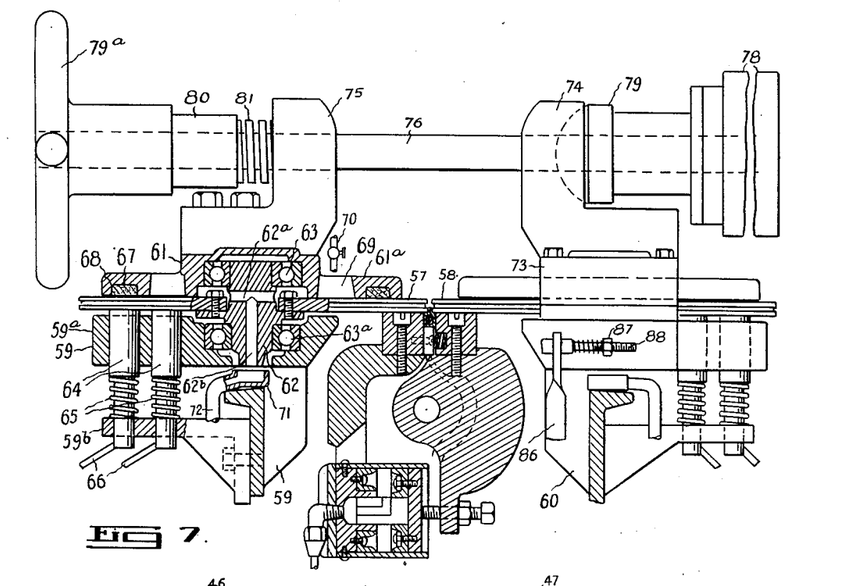
Figure 7 is a cross-section on the line 7—7 in Figure 1, partly broken away and showing the element gripping means as having been moved to carry the element between the welding rollers.

Referring particularly to Figure 7 which shows on the left a section through the arm 59 and the welding wheel 57 and on the right shows the welding wheel 58 and the arm 60 in side elevation, the gripping member with the element clamped therein is shown passing beneath the welding wheels. Since the construction and mounting of each wheel is similar, the description will refer to the wheel 57 which is shown to the left in Figure 7.

A casting 61 forms a bridge bolted at each end to the arm 59 and has formed integrally therewith a cover plate 61a for the welding wheel. The welding wheel is bolted to a hub 62 which is rotatably mounted on ball bearings 63a to the upper end of the arm 59 and by ball bearing 63 to the bridge 61.

Vertically spaced annular brackets 59a and 59b extend outwardly from arm 59 and are provided with a series of registering holes adapted to receive brushes 64 which are pressed by springs 65 into contact with the under surface of the welding wheel 57. Flexible conductors 66 are connected to the lower ends of the brushes and to a source of low voltage, high amperage, power, in practice the source of power supply consists of about 3 volts and 3,000 amperes of intermittent welding current. This means of introducing the current to the welding wheel has many advantages over the usual practice of passing the current through the axle, which causes sparking and fusing and rapid wearing of the bearings. By this arrangement, it is possible to mount the wheels on ball bearings.

A novel cooling method is used. On the under side of the outer edge of the cover plate 61a is formed a groove 67 in which is mounted an annular washer 68 of felt or other suitable material which engages the upper surface of the wheel 57. An aperture 69 is formed in the upper surface of the cover plate 61a and water from a suitable source of supply 70 is permitted to flow into said aperture onto the upper surface of the wheel 57 from which it travels towards the centre and through transverse hole 62a in the hub and perpendicular axle hole 62b to a receiver 71 to which is connected a tube 72 to carry the water away to the waste.

A bridge 73 similar to bridge 61 is mounted on the arm 60 and bolted thereto in a similar manner. Mounted on bridge 73 is a bifurcated lug 74 and mounted on bridge 61 is a similar bifurcated lug 75. Piston rod 76 of compressed air cylinder 78 passes through the bifurcations. A hub 79 on the cylinder 78 engages the lug 74. In a manner not shown, by the application of compressed air to the cylinder the piston rod 76 may be drawn inward.

Screwed to the other end of the piston rod 76 is a wheel 79a having an internally threaded hub 80 and between the hub and the lug 75 is a spring 81. When compressed air is admitted to the cylinder 79, the piston 76 pulls the wheel and hub towards the lug 75. The cylinder hub 79 presses against lug 74 with the result that the arms 59 and 60 are pulled together closing the welding wheels 57 and 58. The welding operation is intermittent owing to the pulsating current. When the current is passing through the welding wheels and across the flange of the element, there is a fusion of the flange causing the welding wheels 57 and 58 to compress the flange so that said wheels move together slightly. The spring 81 permits a slight to and from movement of the welding wheels in operation. By turning the wheel 79, the pressure of the spring 81 may be adjusted.

Figure 10:
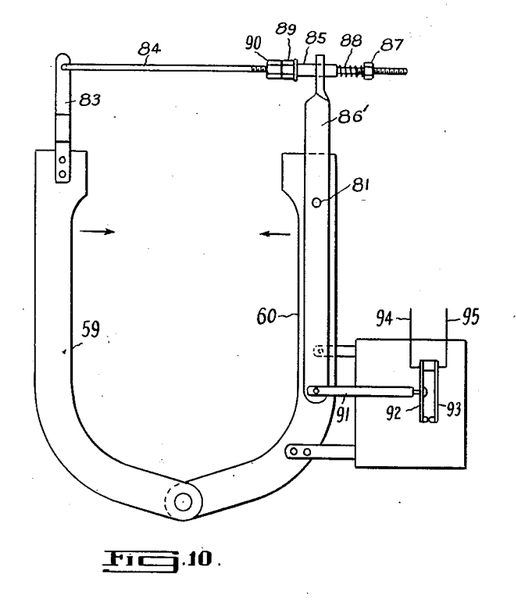
Figure 10 is a diagrammatic side view of the mechanism for breaking the welding circuit when the welding rollers approach one another too closely.

To automatically break the welding circuit before the welding wheels touch, as, for instance after the flanges of the heating element have passed between them, and thus prevent fusing of the welding wheels, an automatic switch is provided which is illustrated more or less diagrammatically in Figure 10.

Shown in this figure are the arms 59 and 60 on which the welding wheels are mounted. Extending upwardly and outwardly from the arm 59 is a bracket 83 to the upper end of which is connected a transverse rod 84, the outer end of which is threaded and passes through a sleeve 85. The sleeve 85 extends through and is slidably mounted in the upper end of lever 86 which is pivoted to the arm 60 at 86'. A nut 87 is threaded on the threaded end of the rod 84 and between the nut and the sleeve is provided a spring 88. Likewise threaded on the rod 84 is a nut 89 located at the other end of the sleeve and a lock nut 90. The spacing of the nut 89 from lever 86 can be adjusted by adjusting the nuts 89 and 90. The spring 88 holds the sleeve 85 normally in contact with the nut 89, and the tension of the spring can be adjusted by nut 87.

It will be seen that when the arms 59 and 60 swing together a predetermined distance the upper end of lever 86 will engage nut 89 and the lower end of lever 86 will swing inwards. A link 91 is pivotally connected to the lower end of lever 86 and to a movable contact member 92 which normally engages fixed contact member 93. However, if the arms 59 and 60 move together sufficiently to cause the welding wheels to nearly touch, link 91 will break the contact. Leads 94 and 95 and contacts 92 and 93 respectively are connected in the welding circuit, so that the welding circuit is broken when contacts 92 and 93 are separated.

Figure 9:
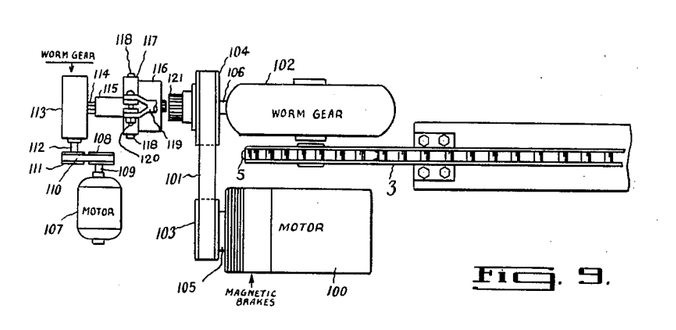
Figure 9 is a plan view of the driving control and braking mechanism.

The drive means is shown in Figure 9 more or less diagrammatically. Electric motor 100 through the medium of belt 101 and worm gear 102 drives sprocket 5 which rotates chain 3 and causes the gripping members 1 to move. Belt 101 extends around pulleys 103 and 104 on motor shaft 105 and worm gear spindle 106 respectively.

Another motor 107 which operates at a slower speed than motor 100 is provided for operating the gripping members at a relatively slow speed during the welding operation. Motor 107 is provided with a pulley 108 on its shaft 109. A drive belt 110 passes around pulley 108 and pulley 111 on spindle 112 of worm gear 113. Slidably mounted on externally splined spindle 114 of worm gear 113 is an internally grooved sleeve 115 to which is secured an internal gear 116. A swingably mounted yoke 117 is pivotally connected at its sides by pins 118, 118 to the gear 116 and at its upper end to clutch operating rod 119 by pin 120.

At the outer end of shaft 106 of the worm gear 102 is an externally toothed gear 121. By pulling the rod 119 to the right in Figure 9 the internal gear 116 will mesh with the gear 121 whereby the machine will be driven by slow speed motor 107. By means hereinafter described the high speed motor will be electrically disconnected when the clutch is operated to change the drive from the high speed motor to the low speed motor, and vice versa, and a centrifugally operated safety device is provided to prevent operation of the clutch when the gear 121 is turning. This safety device is not shown in the drawings since it is a common device and does not form part of this invention.

It will be observed that although the high speed motor 100 is electrically disconnected when slow speed motor 107 is in gear, it will not be physically disconnected but will be turned over by the slow speed motor.

Figure 11:
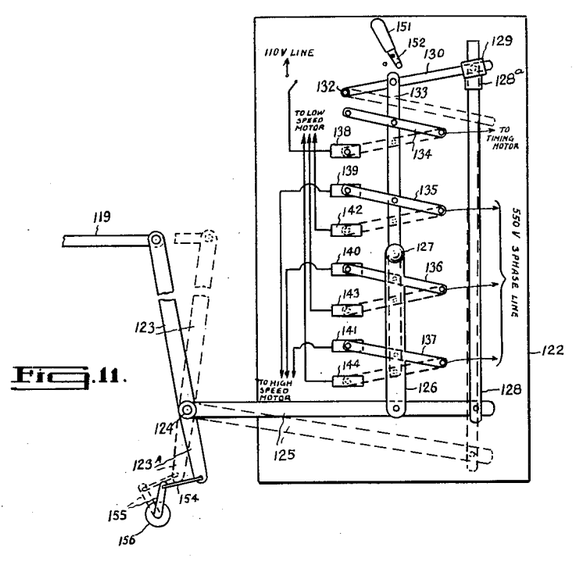
Figure 11 is a diagrammatic view of the control mechanism.
Figure 12:
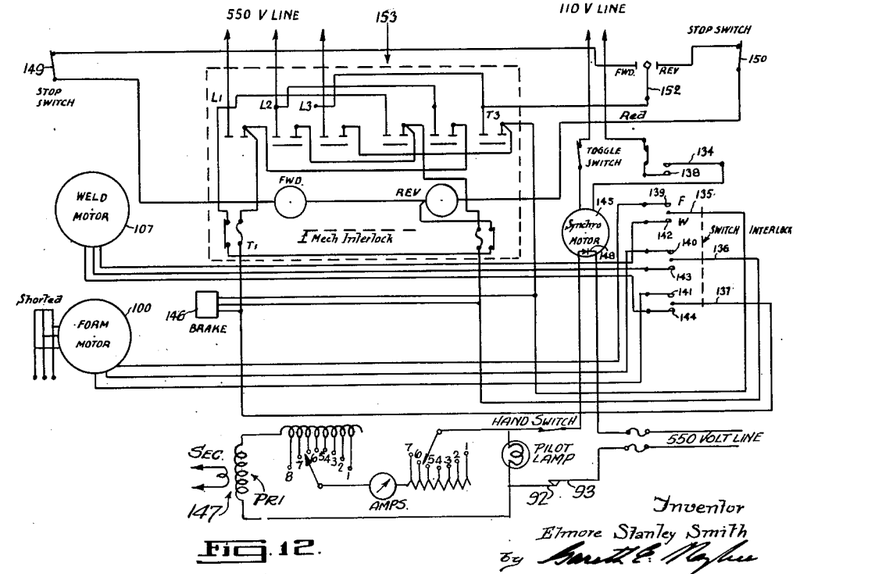
Figure 12 is a wiring diagram showing the electrical system and controls.

Control means for the machine are illustrated diagrammatically in Figures 11 and 12, in which Figure 11 illustrates the control means and Figure 12 the electrical circuit for starting, stopping, and reversing the device.

Referring first to Figure 11, the controls are housed in control box 122. The clutch operating arm 119 extends behind the machine, as shown in Figure 1, and is pivoted to crank arm 123 on transverse rotatable shaft 124. Lever 125 is secured to and extends at right angles to the shaft 124. Extending from lever 125 is operating arm 126 provided with a handle 127. Lifting handle 127 up operates clutch to disconnect the low speed motor 107. Moving handle down operates clutch to connect low speed motor 107.

As shown in Fig. 11, crank arm 123 has a downward projecting end 123a connected by link 154 to operating handle 155 of air valve 156 which controls the air cylinder 79. When handle 127 is raised the valve 156 is operated to open the air line and exhaust the cylinder permitting welding wheels to move apart for the forming operation. When handle 127 is pushed down the valve 156 is operated to admit compressed air to cylinder 79 to close the welding wheels.

In the various figures of the drawings the control members are shown in the position they would assume when the high speed motor only is connected to the driving mechanism. In Figure 11 the position of the controls for connecting the low speed motor is shown in dotted lines.

Pivotally connected to the free end of lever 125, as shown in Figure 1 is a rod 128 which passes through a lug 129 which projects through a slot in the casing and is connected to a lever 130 within the box shown in Figure 11. The rod 128 is provided with a collar 128a fixed thereto and adapted to engage lug 129. A coil spring 131 (shown in Figure 1, but omitted for the sake of clarity from Figure 11) is connected to lug 129 and the end of lever 125. This arrangement provides a lost motion mechanism for actuating the switches, hereafter described, by the same motion that actuates the clutch to engage or disengage the slow speed motor.

Referring to Figure 11, the lever 130 is fulcrumed at 132. An insulated link 133 is pivoted to lever 130 and to a plurality of conducting pivoted contact arms 134, 135, 136 and 137. When handle 127 is lifted it will raise lever 125, rod 128, lever 130, link 133, and contact arms 134, 135, 136, and 137. When handle 127 is pushed down a reverse result will be effected. Lifting of lever 125 will actuate gear shift control arm 119 to put the slow speed motor out of gear, and vice versa.

Contact arm 134 is adapted to engage contact 138 to complete the circuit of a 110 v. circuit to the welding circuit timing motor. Contact arms 135, 136 and 137 are in a three-phase 550 v. circuit for operating the motors. When in their raised position they engage contacts 139, 140, 141 in the high speed motor circuit. When lowered, as shown in dotted lines they engage contacts 142, 143 and 144 in the low speed motor circuit as shown in dotted lines.

It will thus be seen that when the operator lifts the handle 127 the low speed motor will be disengaged, the timing motor circuit and low speed motor circuit will be broken, the high speed motor circuit completed, and the welding wheels moved apart, thus operating the device for forming. When the handle is pushed down the low speed motor will be put into gear, the high speed motor circuit broken and the low speed motor circuit made, the timing motor circuit closed, and the welding wheels closed, thus operating the device for welding.

The electrical circuit is shown in Figure 12. On the right is shown diagrammatically the switch interlock above described. The contacts 134–138 make or break the 110 v. circuit which operates the synchronous timing motor 145. Contacts 139, 140, and 141 are shown as being in a three-phase 550 volt line connected to the high speed motor 100 used for the forming operation. Contacts 142, 143 and 144 are shown as being in a three-phase 550 volt line connected to the low speed motor 107.

An electric brake 146 is connected in the high speed motor circuit, said brake being mounted on high speed motor 100. The brake is of the ordinary kind in which the application of power actuates electromagnets which relieve the brake and when the power is cut off the brake is automatically applied.

The welding current is taken from a 550 volt line as shown at the bottom of Figure 12, passes through automatic switch 92—93 (illustrated in Figure 10) to a variable transformer 147 of a type commonly used to step down the voltage and raise the amperage for welding purposes, and which need not be described in detail. The welding circuit then passes through timer contacts 148 which are connected and disconnected by the timing motor 145 in a known manner to provide a pulsating current for welding.

Limit switches 149 and 150 are mounted at each end of I-beam 2 adapted to be engaged by the grippers 1 as they approach the ends of the track and thus stop the motor and apply the brake automatically.

A reversing lever 151 extends from the control box 122 (see Fig. 11). This lever operates switch 152 shown in Figure 12 in the motor power circuit. Connected in the power circuit is a standard change phase starting and reversing device 153 shown in Figure 12 within the dotted lines. Since this device is well known it is shown diagrammatically within the dotted lines but is not further described. Suffice it to say that by swinging lever 151 to the left or right the motor direction may be reversed and hence the direction of travel of the gripping members.

What I claim as my invention is:

1. In apparatus for closing projecting flanges in sheathed electrical heating elements, a track, an element gripping member mounted on and of less length than said track adapted to receive and hold the heating element with its flanges projecting upwardly above the upper surface of the gripping member, a pair of opposed forming wheels at opposite sides of the track above the line of travel of the gripping member, and means for moving the gripping member on the track relative to the forming wheels, said forming wheels being arranged in such position relative to the gripping member that the upwardly extending flanges of the element when held in the gripping member will pass between the forming wheels and be pressed together, the aforesaid gripping member including a plurality of pairs of opposed pivoted jaws, each pair having an air cylinder for closing the jaws, an air line communicating with the cylinders and a source of air pressure, a valve in the air line, a flexible section in the air line, and a wheel on which the flexible section is wound, and means tending to rotate said wheel to wind up the flexible section, whereby when the gripping member moves in one direction the flexible section will wind and when it moves in the opposite direction the flexible section will unwind.

2. In apparatus for closing together projecting flanges on sheathed electrical heating elements, a track, an element gripping member mounted on and of less length than said track adapted to receive and hold the heating element with its flanges projecting upwardly above the upper surface of the gripping member, a pair of opposed forming wheels rotatably mounted above the line of travel of the gripping member at opposite sides of the track, means for moving the gripping member on the track relative to the forming wheels, said forming wheels being arranged in such position relative to the element gripping member that the upwardly extending flanges of the element when held in the gripping member will pass between the forming wheels, and means for centering the flanges of the element between the forming wheels as they pass between them, said centering means comprising opposed guides arranged below the forming wheels and adapted to engage opposite sides of the element gripping member.

3. In apparatus for closing together projecting flanges on sheathed electrical heating elements, a track, an element gripping member mounted on and of less length than said track adapted to receive and hold the heating element with its flanges projecting upwardly and above the upper surface of the gripping member, a pair of opposed forming wheels rotatably mounted above the line of travel of the gripping member at opposite sides of the track, means for moving the gripping member on the track relative to the forming wheels, said forming wheels being arranged in such position relative to the element gripping member that the upwardly extending flanges of the element when held in the gripping member will pass between the forming wheels, means for centering the flanges of the element between the forming wheels as they pass between them, said centering means comprising opposed guides arranged below the forming wheels and adapted to engage opposite sides of the element gripping member, and means for moving said guides towards each other into engaging position with opposite sides of the element gripping member.

4. In apparatus for closing together projecting flanges on sheathed electrical heating elements, a track, an element gripping member mounted on and of less length than said track adapted to receive and hold the heating element with its flanges projecting upwardly above the upper surface of the gripping member, a pair of opposed forming wheels rotatably mounted above the line of travel of the gripping member at opposite sides of the track, means for moving the gripping member on the track relative to the forming wheels, said forming wheels being arranged in such position relative to the element gripping member that the upwardly extending flanges of the element when held in the gripping member will pass between the forming wheels, and means for centering the flanges of the element between the forming wheels as they pass between them, said centering means comprising opposed guides arranged below the forming wheels and adapted to engage opposite sides of the element gripping member, cam means for moving said guides towards each other into engaging position with the opposite sides of the element gripping member, and a lever and link assembly for actuating the cam means.

5. In apparatus for closing together projecting flanges on sheathed electrical heating elements, an element gripping member adapted to receive and hold the heating element with its flanges projecting upwardly above the upper surface of the gripping member, and a pair of opposed forming wheels rotatably mounted at opposite sides of and above the line of travel of the gripping member, means for moving the gripping member relative to the forming wheels, said forming wheels being arranged in such position relative to the element gripping member that the upwardly extending flanges of the element when held in the gripping member will pass between the forming wheels and be pressed together, and means for raising and lowering the forming wheels relative to the gripping member to vary the position at which the forming wheels engage the flanges of the heating element, said means comprising arms on which the forming wheels are mounted, a shaft, cam bearings on the shaft on which the arms are pivotally mounted and means for turning the shaft to raise and lower the cam bearings.

6. In apparatus for closing and welding together projecting flanges on sheathed electrical heating elements, a track, an element gripping member mounted on and of less length than said track adapted to receive and hold the heating element with its flanges projecting upwardly above the upper surface of the gripping member, a pair of opposed forming wheels rotatably mounted at opposite sides of the track above the line of travel of the gripping member, a pair of opposed welding wheels rotatably mounted at opposite sides of the track above the line of travel of the gripping member, means for moving the gripping member on the track back and forth past the forming wheels and welding wheels, said forming wheels and welding wheels being arranged in such position relative to the element gripping member that the upwardly extending flanges of the element when held in the gripping member will pass first between the forming wheels and be pressed together and then between the welding wheels and be welded together, a brake for stopping the element gripping means at each end of its movement on the track, and means for reversing the movement of the element gripping means.

7. In apparatus for closing and welding together projecting flanges on sheathed electrical heating elements, a track, an element gripping member mounted on and of less length than said track adapted to receive and hold the heating element with its flanges projecting upwardly above the upper surface of the gripping member, a pair of opposed forming wheels rotatably mounted at opposite sides of the track above the line of travel of the gripping member, a pair of opposed welding wheels rotatably mounted at opposite sides of the track above the line of travel of the gripping member, means for moving the gripping member on the track back and forth past the forming wheels and welding wheels, said forming wheels and welding wheels being arranged in such position relative to the element gripping member that the upwardly extending flanges of the element when held in the gripping member will pass first between the forming wheels and be pressed together and then between the welding wheels and be welded together, a brake for stopping the element gripping means at each end of its movement on the track, means for reversing the movement of the element gripping means, and means for reducing the speed of travel of the element gripping member as it passes the welding wheels.

8. In apparatus for welding together projecting flanges on sheathed electrical heating elements, a track, an element gripping member mounted on said track adapted to receive and hold the heating element with its flanges projecting upwardly above the upper surface of the gripping member, a pair of opposed rotatable welding wheels mounted at opposite sides of the track above the line of travel of the gripping member, pneumatic means for pressing the wheels together to compress the flanges of the element therebetween, means for passing a high amperage welding electrical current between the welding wheels and through the flanges of the element, means for moving the gripping member on the track relative to the welding wheels, said welding wheels being arranged in such position relative to the gripping member that the upwardly extending flanges of the element when held in the gripping member will pass between the welding wheels and be welded together, means for reducing the rate of travel of the gripping member, and a control for actuating the means for reducing the rate of travel of the gripping member and simultaneously admitting compressed air to the pneumatic compressing means to move the welding wheels together.

9. In apparatus for welding together projecting flanges on sheathed electrical heating elements, a track, an element gripping member mounted on said track adapted to receive and hold the heating element with its flanges projecting upwardly above the upper surface of the gripping member, a pair of opposed rotatable welding wheels mounted at opposite sides of the track above the line of travel of the gripping member, pneumatic means for pressing the wheels together to compress the flanges of the element therebetween, means for passing a high amperage welding electrical current between the welding wheels and through the flanges of the element, a timer in the welding circuit for producing an intermittent current, including a timing motor, means for moving the gripping member on the track relative to the welding wheels, said welding wheels being arranged in such position relative to the gripping member that the upwardly extending flanges of the element when held in the gripping member will pass between the welding wheels and be welded together, means for reducing the speed of travel of the gripping member, and a control for actuating the means for reducing the speed of travel of the gripping member, actuating the timing motor simultaneously and admitting compressed air to the pneumatic compressing means to move the welding wheels together.

10. In apparatus for closing and welding together projecting flanges on sheathed electrical heating elements, a track, an element gripping member mounted on said track adapted to receive and hold the heating element with its flanges projecting upwardly above the upper surface of the gripping member, and a pair of opposed forming wheels rotatably mounted at opposite sides of the track, a pair of opposed welding wheels rotatably mounted at opposite sides of the track above the gripping member, means for moving the gripping member on the track relative to the forming wheels and welding wheels, said means including a high speed motor, and a low speed motor, means for reversing the direction of the motors, a clutch for connecting the means for moving the gripping member either to the high speed motor or the low speed motor for varying the rate of travel of said gripping member on the track, said forming wheels and welding wheels being arranged in such position relative to the element gripping member that the upwardly extending flanges of the element when held in the gripping member will pass first between the forming wheels and be pressed together and then between the welding wheels and be welded together.

11. In apparatus for welding together projecting flanges on sheathed electrical heating elements, an element gripping member adapted to receive and hold the heating element with its flanges projecting upwardly above the upper surface of the gripping member, a frame, a pair of arms mounted on the frame and independently movable transversely of the line of travel of the element gripping member, a pair of opposite rotatable welding wheels one of which is mounted on each arm, means for moving the gripping member relative to the welding wheels, said welding wheels being arranged in such position relative to the gripping member that the upwardly extending flanges of the element when held in the gripping member will pass between the welding wheels and be welded together, means for connecting the arms together and moving them to and from each other to adjust the spacing of the welding wheels, said means comprising a lug on each arm, a compressed air cylinder engaging one lug, a piston rod of said cylinder extending between the lugs, a stop at the outer end of the piston rod, a spring between said stop and the adjacent lug, and means for admitting and exhausting air from the cylinder to move the piston rod relative to the last mentioned lug outwardly to permit the arms to spread apart and inwardly to compress the arms against the pressure of the spring.

12. In apparatus for welding together projecting flanges on sheathed electrical heating elements, a frame, a pair of arms mounted on said frame, a rotatable welding wheel mounted on each arm in opposed relationship, said wheels having vertical axes and substantially flat horizontal upper and lower surfaces, a hub on each welding wheel having a transverse passageway therein opening above the upper surface of the welding wheel and a vertical passageway communicating with the transverse passageway and opening below the hub, bearings between the hub and the arm on which the welding wheel rotates, a bridge secured at each end to the arm, a cover plate on the bridge extending over each wheel having a recess in the under side, said recess communicating with the transverse passageway in the hub, means for feeding a cooling fluid to the upper face of said wheels whereby said fluid will flow over the wheels beneath the cap and drain through the openings in the hub, and sealing means adjacent the periphery of the cover plate engaging the upper surface of the welding wheel.

13. In apparatus for welding projecting flanges on sheathed electrical heating elements, an element gripping member adapted to receive and hold the heating element with its flanges projecting above the upper surface of the gripping member, a frame, a pair of arms mounted on the frame and independently movable transversely of the line of travel of the element gripping member, a welding wheel rotatably mounted on each arm, on each side of the element gripping member and above the line of travel thereof, a welding circuit for passing a high amperage welding electrical current between the welding wheels and through the flanges, means tending to move the arms, and thus the welding wheels, together, a switch in the welding circuit mounted on one of the arms, and means actuated by the relative movement of the arms for actuating the switch to break the welding circuit when the wheels are at a predetermined relative position comprising a linkage between the other arm and the switch.

14. In apparatus for welding projecting flanges on sheathed electrical heating elements, an element gripping member adapted to receive and hold the heating element with its flanges projecting above the upper surface of the gripping member, a frame, a pair of arms mounted on the frame and independently movable transversely of the line of travel of the element gripping member, a welding wheel rotatably mounted on each arm, on each side of the element gripping member and above the line of travel thereof, a welding circuit for passing a high amperage welding electrical current between the welding wheels and through the flanges, means tending to move the arms, and thus the welding wheels, together, a switch in the welding circuit mounted on one of the arms, and means actuated by the relative movement of the arms for actuating the switch to break the welding circuit when the wheels are at a predetermined relative position comprising a lever for actuating the switch, a rod secured to the other arm, means on the rod for engaging the lever to actuate the switch.

ELMORE STANLEY SMITH.

REFERENCES CITED

The following references are of record in the file of this patent:

UNITED STATES PATENTS

| Number | Name | Date |
|---|---|---|
| 1,052,820 | Higgin | Feb. 11, 1913 |
| 1,080,651 | Noll | Dec. 9, 1913 |
| 1,709,587 | Lawson | Apr. 16, 1929 |
| 1,956,172 | Holt | Apr. 24, 1934 |
| 1,992,553 | Sykes | Feb. 26, 1935 |
| 2,018,379 | Pfeiffer | Oct. 22, 1935 |
| 2,302,481 | Titus | Nov. 17, 1942 |
| 2,324,068 | Crandell | July 13, 1943 |
| 2,415,912 | Scherl | Feb. 18, 1947 |

FOREIGN PATENTS

| Number | Country | Date |
|---|---|---|
| 318,593 | Germany | Feb. 4, 1920 |
| 391,925 | Germany | Mar. 13, 1924 |